US007624980B2

(12) United States Patent
Tewksbury et al.

(10) Patent No.: US 7,624,980 B2
(45) Date of Patent: Dec. 1, 2009

(54) TOOL-LESS ROTARY VACUUM WICKETTER ASSEMBLY

(75) Inventors: Robert J. Tewksbury, Seneca Falls, NY (US); Mark J. Clark, Phelps, NY (US)

(73) Assignee: Pearl Technologies Incorporated, Savannah, NY (US)

( * ) Notice: Subject to any disclaimer, the term of this patent is extended or adjusted under 35 U.S.C. 154(b) by 64 days.

(21) Appl. No.: 11/774,834

(22) Filed: Jul. 9, 2007

(65) Prior Publication Data

US 2009/0016856 A1 Jan. 15, 2009

(51) Int. Cl.
*B65H 29/32* (2006.01)
*B65G 57/00* (2006.01)

(52) U.S. Cl. .......................................... 271/196; 414/27

(58) Field of Classification Search ................. 271/196, 271/315; 414/27; 285/276; 464/901; 482/107; 70/182, 184, 187; 173/167; 403/322.2, 310, 403/312, 344

See application file for complete search history.

(56) References Cited

U.S. PATENT DOCUMENTS

| | | | | | |
|---|---|---|---|---|---|
| 698,098 | A | * | 4/1902 | Barnes et al. | 403/373 |
| 3,921,827 | A | * | 11/1975 | Joice | 414/793 |
| 4,286,907 | A | * | 9/1981 | Houle et al. | 414/793 |
| 4,459,172 | A | * | 7/1984 | Achelpohl et al. | 156/515 |
| 4,573,955 | A | * | 3/1986 | Mory et al. | 493/204 |
| 4,606,537 | A | * | 8/1986 | Achelpohl | 271/196 |
| 4,668,158 | A | * | 5/1987 | Sample et al. | 414/800 |
| 4,877,233 | A | * | 10/1989 | Pottorff | 271/196 |
| 4,954,033 | A | * | 9/1990 | Sanders | 414/27 |
| 5,143,367 | A | * | 9/1992 | Pottorff | 271/196 |
| 5,911,553 | A | * | 6/1999 | Pickering et al. | 414/27 |
| 5,927,810 | A | * | 7/1999 | Liao | 297/344.12 |
| 5,941,653 | A | * | 8/1999 | Cipriani | 403/344 |
| 6,112,909 | A | * | 9/2000 | Moseley | 211/32 |
| 6,273,663 | B1 | * | 8/2001 | Pickering et al. | 414/27 |
| 6,840,701 | B2 | * | 1/2005 | DaCunha et al. | 403/290 |

OTHER PUBLICATIONS

Websters New Basic Dictionary, Houghton Mifflin Company, p. 14.*

* cited by examiner

*Primary Examiner*—Patrick H Mackey
*Assistant Examiner*—Patrick Cicchino
(74) *Attorney, Agent, or Firm*—Bernhard P. Molldrem, Jr.

(57) ABSTRACT

A rotary vacuum wicketting arrangement has a rotary hub body positioned on a shaft or spindle and supporting a number of pickup arms, and a non-rotating vacuum spinning head that provides vacuum to the rotating hub body and pickup arms over a portion of their arcuate travel. The rotary hub body is provided with a lock ring formed or a pair of half rings with hand levers so that the position of the hub body on the shaft can be adjusted toollessly. The pickup arms are held in place in their sockets by ball and spring detents, so that they can be pulled out for cleaning and reinserted without tools. A friction fitted plug closes off the end of each arm.

10 Claims, 4 Drawing Sheets

TOOL-LESS ROTARY VACUUM WICKETTER ASSEMBLY

BACKGROUND OF THE INVENTION

This invention relates to plastic film handling equipment and is more specifically directed to a machine for transporting a workpiece formed from a web of plastic film material. An example of such a workpiece is a plastic bag, which is produced at a bag machine or similar station and is to be transported to a collection station. The invention is concerned with a rotary wicketter, i.e., a rotary transport device in which an array of vacuum arms, i.e., hollow perforated bars, extend radially out from a rotor hub, and in which vacuum is applied for a portion of the rotation to carry the plastic film workpiece from one station to another.

Vacuum wicketters are widely used in the plastic film trade, and their general construction and operation is well known. The general design and operation of a wicketter can be understood, e.g., from Gaffal U.S. Pat. No. 6,702,277 (Mar. 9, 2004), Stock U.S. Pat. No. 5,074,735 (Dec. 24, 1991), and Sample et al. U.S. Pat. No. 4,668,158 (May 26, 1987). An improved wicketter hub arrangement in which the hub is formed of a synthetic plastic resin is described in Pottorff U.S. Pat. No. 4,877,233 (Oct. 31, 1989), and also in Pottorff U.S. Pat. No. 5,143,367 (Sep. 1, 1992). The conventional wicketter is of metal construction, with a two-part hub assembly and vacuum arms extending outward from the hub. The hub assembly has a rotating main hub, which is secured to the rotating shaft, and a vacuum hub that does not rotate. A vacuum source, i.e., a vacuum pump, connects via a hose to the stationary vacuum hub. The rotary hub has vacuum ports on the side that faces the vacuum hub, and these are arranged so that there is vacuum applied to the rotating arms as they proceed along an arc corresponding to the transport path of the workpieces. There is typically a semicircular opening on the facing side of the vacuum hub for this purpose. In many arrangements, a pair of hubs are used, each with its array of vacuum pickup arms, both mounted on the same rotary shaft or spindle. This allows the workpiece to be gripped on either edge by the vacuum arms and transported to the collection station.

The rotary hub can carry any number of arms, but typically there are six or eight spaced evenly around the body of the hub. The arms can be of any cross section, and these are often hollow extrusions of square or rectangular profile on the part that extends radially out from the hub, but are typically circular in profile in the part that fits into an arm socket in the hub body. Each arm, in its leading side, i.e., in the rotation direction, has a vacuum channel and one or more rows of vacuum openings leading from the hollow interior of the arm. This configuration ensures that vacuum is applied to the workpiece to hold it in place on the arm. Also, the leading surface may be coated with a ceramic material, or may have a wear plate installed on it, to allow for the erosive nature of the plastic film material.

These hollow wicketter vacuum arms have a plug or plate at their radial outward end to seal the interior cavity. These are usually welded or cemented in place, but in some cases are secured by threaded screws, and are not meant to be easily removed.

It is well understood that the manufacture and handling of the plastic film web and products constructed from the film create a significant volume of plastic dust. The dust collects inside the vacuum wicketter, typically inside the vacuum arms and in the rotary hub. If the wicketter is not cleaned at a rather frequent interval, the plastic dust can clog the wicketter and interfere with its effective operation. Typically a cleaning operation involves significant machine down time to remove each arm from the hub, clean the plastic dust from its interior cavity, and then re-install the arm. This involves having to unscrew one or two machine screws that hold each arm in place, and then reinsert and fasten these when the arm is replaced.

It is also necessary from time to time to reset the position of the wicketter hubs along the spindle or shaft. When that occurs, it is necessary first to loosen a locking ring that holds the hub body to the shaft or spindle. When the hub has been moved and re-aligned, the hub lock ring has to be tightened again to secure the hub to the shaft. A screwdriver and/or wrench is needed for this. Also, because the locking ring has a tightening mechanism on one side only, it has a tendency to pinch and may not tighten evenly on the shaft.

It is desired that the process of setting up the wicketter be made as simple and quick as possible to minimize machine downtime and to reduce the number of steps and the number of fastener parts and tools required. It is also desired to facilitate the removal and reinsertion of the vacuum pickup arms so the plastic dust can be cleaned from them without difficulty and without requiring equipment or tools.

OBJECTS AND SUMMARY OF THE INVENTION

Accordingly, it is an object of this invention to provide an improved vacuum wicketter which avoids the drawbacks of the prior art, and which can be serviced, cleaned, and adjusted without requiring tools.

It is another object of the invention to provide a wicketter which is easier and faster to service, and in which the vacuum pickup arms can be removed and installed without having to remove, install, loosen, or tighten separate fastener parts.

It is a further object to provide a wicketter in which the position of the rotary hub on the shaft can be adjusted and aligned tool-lessly.

According to one aspect of the present invention, a rotary vacuum wicketting arrangement features tool-less adjustment and tool-less detachment of parts for cleaning. A rotary hub is mounted to rotate with a spindle or shaft. The rotary hub is formed of a main hub body portion which has a plurality of peripheral arm sockets angularly distributed around it. A lock ring, or grip ring is secured to the main hub body portion. Here, the grip ring has at least one hand lever that can be set by hand to a first position in which the grip ring grips the hub to the shaft and to a second position in which the grip ring is released from gripping the shaft. A wear plate is secured onto a face of the main hub body portion, with openings communicating with the respective arm sockets.

The array of vacuum pickup arms are positioned in these sockets, projecting generally radially from the rotary hub. The arms releasably secure into respective ones of the arm sockets. A non-rotating vacuum hub is positioned on the shaft and faces the wear plate of the rotary hub. This is configured to apply vacuum to the arms over a portion of their rotation about said shaft.

The hub body portion has one or more spring detents respectively located at each arm socket, and each of the vacuum pickup arms has at least one corresponding recess at its radially inward end portion. When the arm is inserted into the socket, the detent engages the recess and holds the arm securely, but releasably in place. Favorably, for each arm socket there is a pair of said spring detents positioned radially one above the other, and the arms have a corresponding pair of recesses to engage these detents.

In a preferred arrangement, the lock ring or grip ring is formed as two semi-annular members or half-rings, with a pair of threaded posts or shafts that fit into the ends of the two half-rings to join them. In this arrangement there are two hand levers, with an associated one the hand levers being positioned to rotate a corresponding one of said threaded posts. This arrangement permits the lock ring to tighten evenly on the shaft or spindle.

The vacuum pickup arms are favorably formed as a tubular rectangular extrusions of aluminum or an aluminum alloy. A leading side of the arm forms a gripping face, for gripping the plastic film workpiece. There is a radially extending row of vacuum openings formed along this gripping face. The vacuum pickup arms each have a rectangular opening at their outward end. A rectangular plug is friction-fitted into the outer end of the arm, so it securely closes off the cavity of the arm, but can be removed (and re-installed) without tools. This facilitates cleaning the pickup arm's interior cavity. In a preferred embodiment, the rectangular plug is formed with an outer rectangular plate portion that matches the profile of the extrusion used for the arm. A rectangular projection is formed on the plate and is dimensioned to fit into the open outward end of the arm. A peripheral groove is formed on the rectangular projection, and a resilient seal ring is seated on the peripheral groove.

Favorably, the pickup arms have a surface treatment on their leading or gripping face, to improve friction between such arm and a plastic film workpiece to be carried thereon. This avoids the need for a ceramic coating or for a separate wear plate, which represent the current state of art. The surface treatment provides a hard, high-friction contact surface for the plastic bags or other workpieces.

In order to communicate effectively through the wear plate opening with the vacuum hub, each arm has a rectangular cutout formed on male or inserted end, i.e., the radial inward end. This extends from the inward end of the arm a few centimeters along its axial-facing surface.

Because there is a stronger contact area between the hub wear plate and the corresponding surface of the vacuum hub, than with a conventional wicketter that places a thrust bearing between these two hub members, there less vacuum leakage than with the conventional arrangement. In order to compensate for the smaller leakage there, the hose inlet connector on the vacuum hub is in the form of an elongated tube with a series of openings along its length. This construction permits the position of the vacuum hose from the vacuum source to be adjusted to expose some or all of these openings, thus permitting control of leakage of vacuum to the vacuum hub.

Certain terms of orientation, such as vertical, downward, left and right may be used in respect to the embodiment described below. However, it should be appreciated that such terms are used for simplifying the description, and that the principles of this invention would be the same regardless of the positional orientation of the apparatus.

The above and many other objects, features, and advantages of this invention will become apparent from the ensuing description of an exemplary embodiment, which should be read in conjunction with the accompanying Drawing.

DETAILED DESCRIPTION OF THE PREFERRED EMBODIMENT

Figure 1:
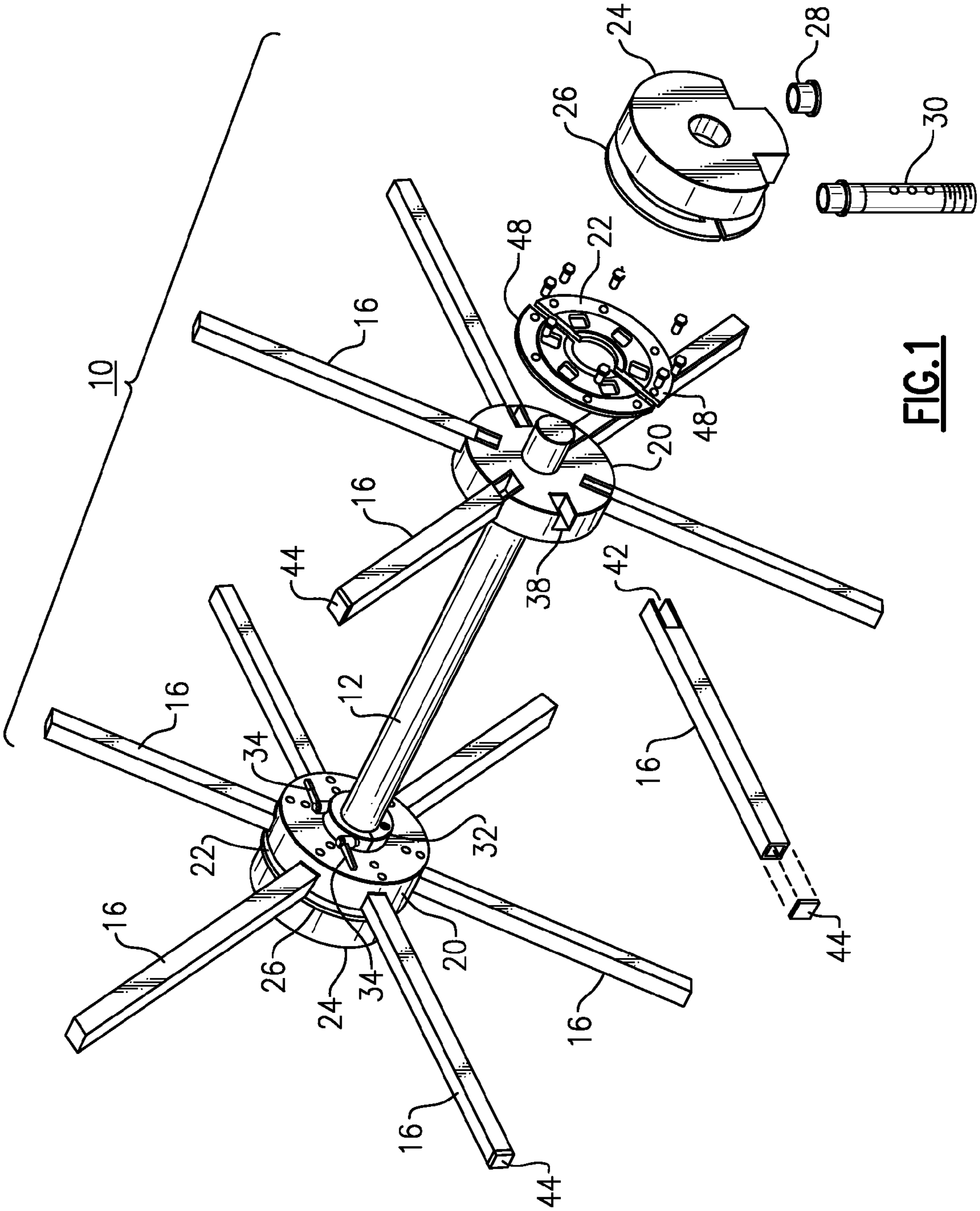
FIG. 1 is a perspective assembly view of a rotary vacuum pickup arrangement according to one preferred embodiment of the invention.

With reference to the Drawing, FIG. 1 illustrates a rotary transfer arrangement that may be employed in carrying plastic film articles, e.g., bags, from one station to another, for example, from a bag machine to a bag stacking station, such as a wicket plate. Here, the rotary transfer station is in the form of a vacuum wicketter 10, in which there is a rotary shaft 12 that carries a pair of hub assemblies 14, 14, spaced a pre-set distance from one another, and each of which carries an array of vacuum pickup arms 16. These arms project radially from the hub assemblies and are angularly spaced about the axis of the hub assemblies. In this example, for each hub assembly there are six arms 16, at sixty-degree spacing. However, rotary wicketters may have eight arm arrays, in which the arms are spaced at forty-five degree intervals. Other wicketters have other configurations, e.g., nine arms at forty-degree intervals.

Figure 2:
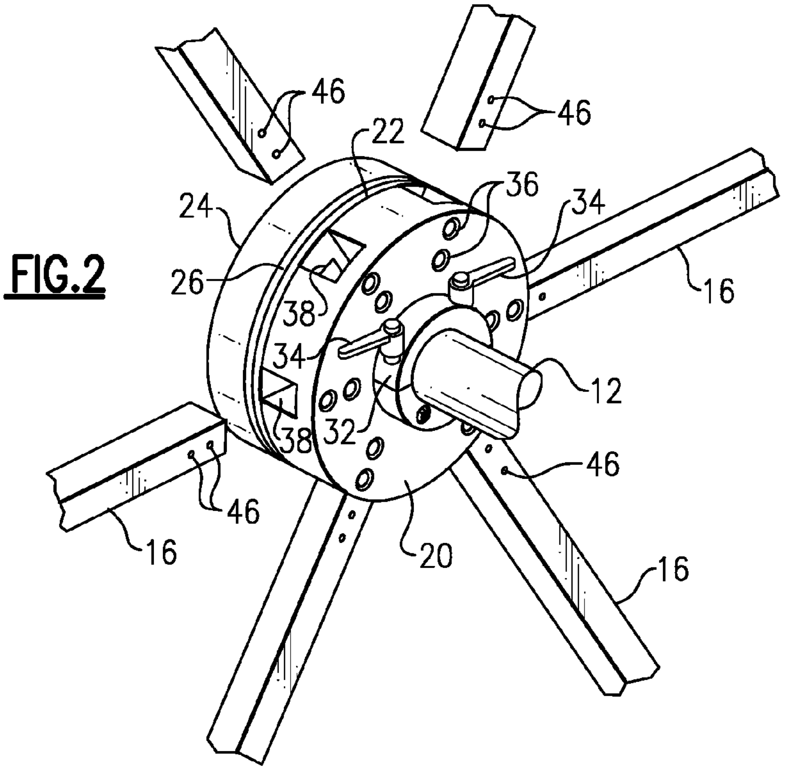
FIGS. 2 and 3 are more detailed perspective assembly views of portions of this embodiment.
Figure 3:
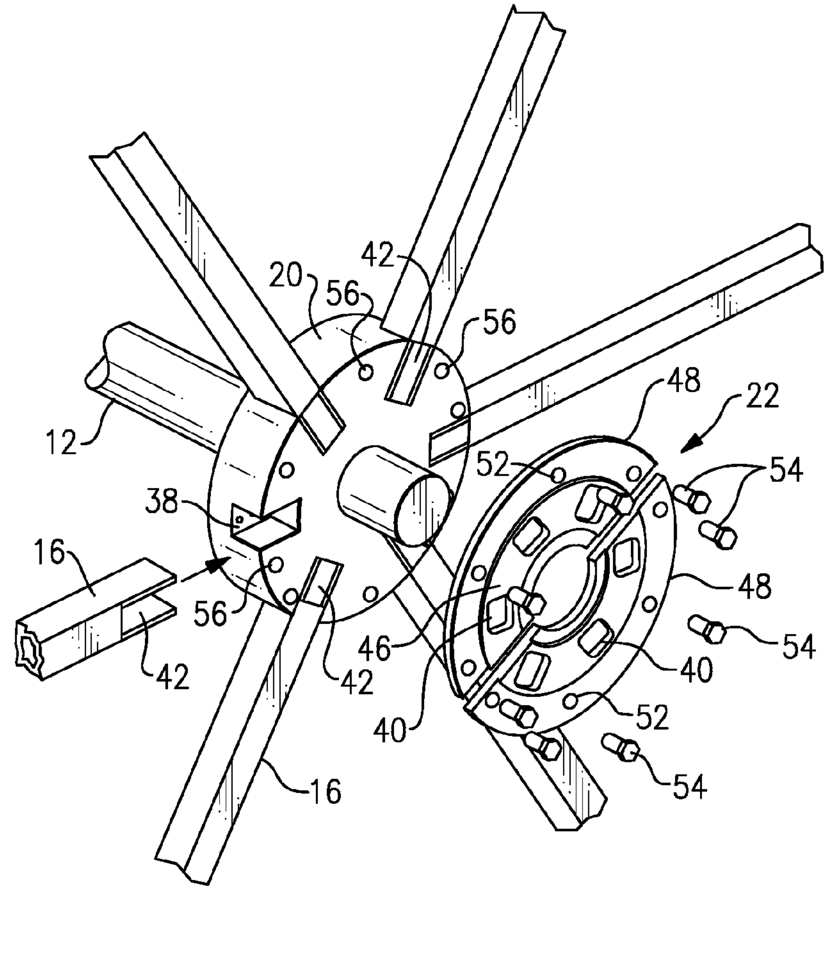
Figure 4:
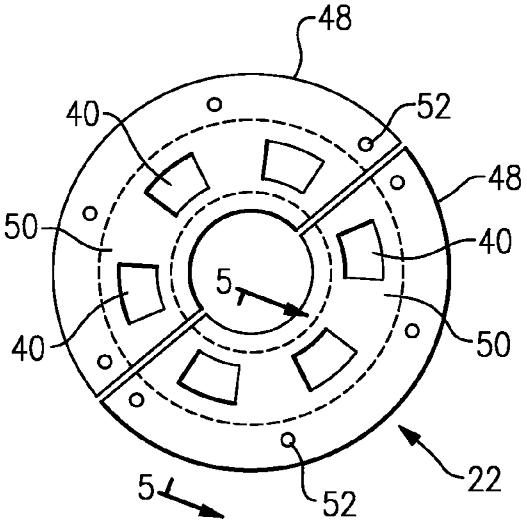
FIG. 4 is a plan view of a split wear plate as employed in this embodiment.
Figure 6:
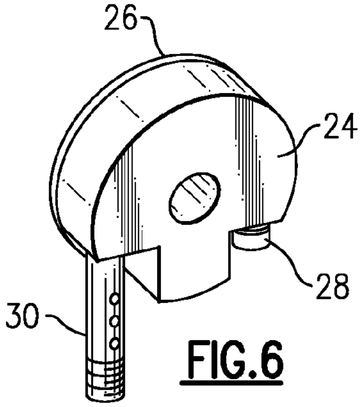
FIGS. 6 and 7 are perspective views of the vacuum hub of this embodiment.
Figure 5:
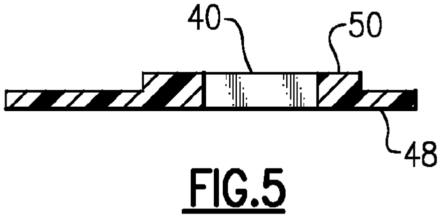
FIG. 5 is a cross section taken at 5-5 of FIG. 4.

As shown with further reference to FIGS. 2 and 3, the hub assemblies 14 are each formed from a main rotary hub body 20 that is secured onto the shaft 12 so that it rotates with the shaft, and a wear plate 22 that is attached to the hub body 20 on one circular face. A non-rotating vacuum hub 24 is mounted over the shaft 12, and is journaled at its center on the shaft so that the shaft can turn freely without rotating the vacuum hub. There is a stationary wear plate 26 mounted on the vacuum hub which contacts the wear plate 22 of the main hub body 20. Favorably, these wear plates 22 and 26 are formed of a plastic resin having a lubricant filler so that they have a low mutual coefficient of friction. These wear plates are split, i.e., formed as mating semicircular portions, so that each can be installed without having to remove the rotary hub 20 or the vacuum hub 24 from the shaft. While these features will be described in more detail later, a rotary wicketter hub with this split wear plate feature is described in earlier U.S. Pat. No. 5,143,367 to Earl T. Pottorff.

The non-rotating vacuum hub has a vacuum chamber that communicates with openings in the rotary wear plate 22, for applying vacuum to the pickup arms 16 over their travel between pickup station and delivery station, i.e., over an upper portion of their arcuate journey. In this embodiment there are two vacuum openings, disposed at the two angled cutouts in the vacuum hub 24. A plug 28 is inserted into one opening for blocking that opening off, and a vacuum inlet connector 30 is positioned in the other vacuum opening. A vacuum hose (not shown) extends from a vacuum source such as the suction side of a blower or compressor, to this connector 30. The vacuum hose covers some of the openings, but leaves others exposed, and by selecting the position of the vacuum hose on the inlet connector 30 it is possible to control the amount of vacuum leakage, so that the vacuum inside the vacuum hub (and within the vacuum pickup arms) is controlled to a level that does not interfere with the pickup and transit of the workpieces.

A lock ring or gripping ring 32 is affixed onto one side of the hub body 20 and is positioned surrounding the rotary shaft 12. Here the ring 32 is a split ring, i.e., formed of two semi-annular halves, and these are joined together at their ends by a pair of threaded posts or similar threaded members. Each post has a band lever 34 attached at a top end of the respective threaded post for tightening and loosening the threaded posts and the two semi-annular halves of the ring 32. When the two levers are rotated forward, the two halves of the split ring 32 are loosened, so that the rotary hub 20 can be rotated in respect to the shaft 12, and can be moved axially along the shaft. When the two levers are rotated outward, this action tightens the two halves of the split ring 32, and locks the ring onto the shaft. The use of two levers 34 in this fashion eliminates any requirement for a tool to loosen and unlock the ring so that the hub can be rotated or moved axially. Because the ring 32 is split into two halves and is tightened at both sides, the ring 32 does not pinch at one side, but grasps the shaft 12 securely during normal operation, and also permits adjustment of the axial and angular positions of the hubs along the shaft, all without need for tools.

Spring and ball detents 36 are fitted into the rotary hub portion 20, which releasably hold the various arms 16 of the array securely in place in the hub portion 20. These also allow the arms 16 to be pulled out for cleaning, and later be pushed back into place, so that changeout or removal and replacement of the pickup arms can be carried out quickly, and also without requiring any tools.

The main rotary hub body 20 has a plurality of rectangular cutouts 38 formed on its outer cylindrical wall and these extend down one face, where they are closed off behind the wear plate 22, as shown. There are square openings 40 in the wear plate 22 at the positions of these rectangular cutouts, and these serve as vacuum openings to communicate vacuum with the vacuum hub 24 through the openings in the vacuum wear plate 26.

Thus, the cutouts 38 and the wear plate 22 between them define sockets for the inner or male portions of the pickup arms 16.

Each of the arms 16 has a portion of one side cut away at the inner end, thus defining a rectangular cutout 42. This cutout is then at the position of the associated square opening 40 in the wear plate 22. Returning to FIG. 1, in this embodiment each of the arms 16 is in the form of a metal tubular extrusion, e.g., aluminum or aluminum alloy, of rectangular profile. The arms also each have an internal cavity, also of rectangular cross section. The arms thus each have a rectangular open end, which is normally sealed off by an end plug 44. The end plug is friction-fitted into place at the end of the arm, and can be pulled out when necessary, e.g., for cleaning plastic dust from the interior cavity of the pickup arm.

Figure 7:
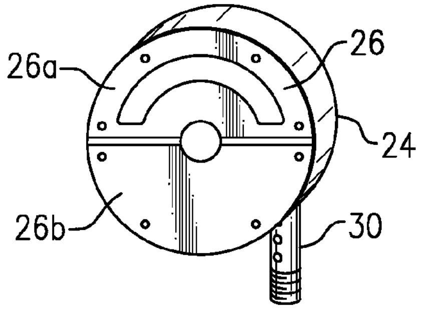

FIG. 3 illustrates the construction of the split wear plate 22 that attaches onto the main rotary hub body 20. The wear plate 22 is formed of two identical halves 48, 48. There is a raised annular contact area 50, formed in the area where the vacuum openings 40 are located. This area 50 contacts the corresponding zone of the non-rotating vacuum wear plate 26, with a low mutual coefficient of friction. A number of bolt holes 52 are arranged more or less evenly around the periphery of the wear plate 22, to receive threaded fasteners 54 that fit into corresponding threaded openings 56 in the hub body 20. Details and advantages of the split wear plate are provided in U.S. Pat. No. 5,143,367. The non-rotating wear plate 26 is advantageously provided as a pair of semi-circular halves 26*a*, 26*b*, as shown in FIG. 7, and/or as is also described and illustrated in U.S. Pat. No. 5,143,367.

Figure 8:
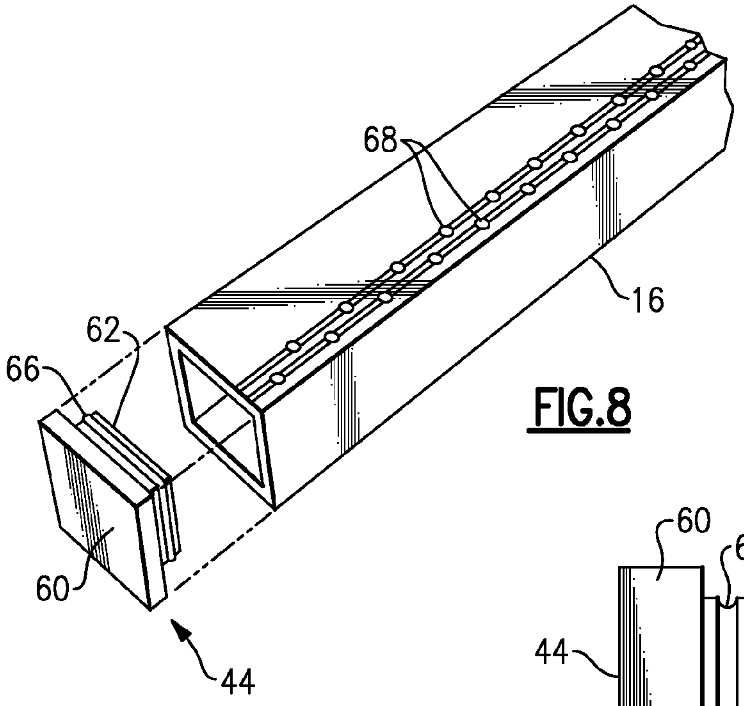
FIG. 8 is a perspective assembly view of a portion of one of the vacuum pickup arms of this embodiment.
Figure 9:
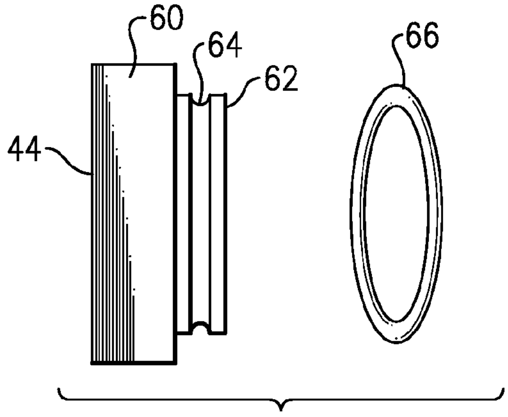
FIG. 9 is a perspective view of an end plug of this embodiment.
Figure 10:
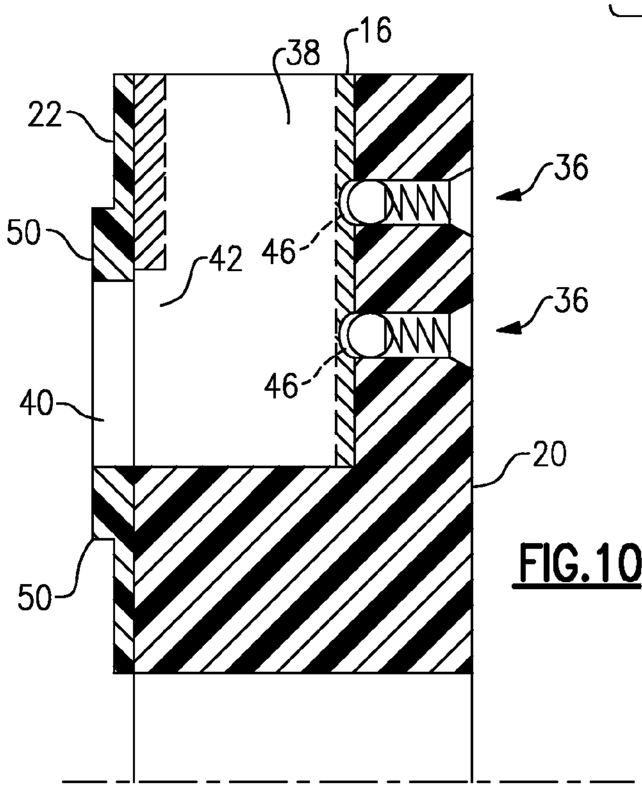
FIG. 10 is a cross section of the rotary hub of this embodiment.

FIG. 8 shows the radial outer end of one of the vacuum pickup arms 16, which is formed as an extruded tube of an aluminum alloy, having a generally rectangular cross section, so as to define a generally rectangular inner cavity. The outer end (at the left in this view) of the arm 16 is a rectangular opening, which is closed off by means of the removable plug member 44. Details of the latter are shown in FIG. 9. The plug is formed of an outer plate 60 and a reduced-dimension rectangular projection 62. The outer plate 60 is made to have the same dimensions as the profile of the arm 16, and the projection has substantially the same dimensions as the interior cavity of the arm 16. A peripheral groove 64 is formed around the projection 62, and an elastomeric sealing ring 66 is seated in this groove 64. The seal ring 66 compresses against the interior wall of the arm 16 when the plug is inserted, giving a positive friction fit. There is vacuum applied to the arm, in normal operation, so the friction fit is sufficient to hold the plug 44 in place at the end of the arm. The plug 44 can be pulled out of the arm, without need for tools, to achieve access to the cavity of the arm for cleaning the plastic dust from the pickup arm. Later, the plug 44 can be pushed back in by hand. Caulking, sealing compound, or other sealing materials are not needed.

As also shown here, there are one or more rows of vacuum apertures 68 on the leading surface, i.e., the surface of the arm that faces in the rotation direction, and these may be positioned along vacuum grooves, as desired.

In some preferred arrangements, the pickup arm is provided without a ceramic coating and without a replaceable wearplate, such as was the practice in the prior art. Instead, the arm may be provided with a surface treatment on the leading surface to improve the hardness of the extrusion and also to increase the coefficient of friction with the plastic film workpiece.

While this invention has been described in detail with reference to a selected preferred embodiment, it should be recognized that the invention is not limited to such embodiment. Rather, many modifications and variations will present themselves to persons skilled in the art without departing from the scope and spirit of the invention, as defined in the appended claims.

We claim:

1. Rotary vacuum wicketting arrangement with tool-less adjustment and detachment for cleaning; comprising a rotary shaft a rotary hub mounted to rotate with said shaft and including a main hub body portion having a plurality of peripheral arm sockets angularly distributed thereon;

a split grip ring secured to said main hub body portion and including one or more hand levers that can be set to a first portion in which the grip ring grips the hub to said shaft and to a second position in which the grip ring is released from gripping said shaft, in which said split grip ring is formed as two semi-annular members joined by a pair of threaded posts, with the associated ones of said hand levers being affixed onto top ends of said threaded posts and positioned to rotate said threaded posts, such that the split grip ring can be loosened on said shaft and re-secured without tools;

a wear plate secured onto one face of said main hub body portion, with openings communicating with said arm sockets;

a plurality of vacuum pickup anus releasably secured into respective ones of said arm sockets and projecting generally radially from said rotary hub; and a non-rotating vacuum hub positioned on said shaft and facing said wear plate of said rotary hub applying vacuum to said arms over a portion of their rotation about said shaft.

2. Rotary vacuum wicketting arrangement according to claim 1, wherein said hub body portion includes a pair of radially aligned spring detents respectively located at each said arm socket; and each of said vacuum pickup arms has a corresponding pair of radially aligned recesses at a radially inward portion thereof to hold the arm releasably in place in the respective socket, so that the arms can be tool-lessly removed and replaced.

3. Rotary vacuum wicketting arrangement according to claim 1, wherein said vacuum pickup arms are each formed as a tubular rectangular extrusion, with one side thereof forming a gripping face, and with a radially extending row of vacuum openings formed along said gripping face.

4. Rotary vacuum wicketting arrangement according to claim 3, wherein said vacuum pickup arms each have a rectangular open outward end, and a rectangular plug friction-fitted therein, which is removable without tools from said open outward end.

5. Rotary vacuum wicketting arrangement according to claim 4, wherein said rectangular plug has an outer rectangular plate portion, a rectangular projection formed thereon and dimensioned to fit into the open outward end of the associated arm, with a peripheral groove formed thereon, and a resilient seal ring fitted onto said peripheral groove.

6. Rotary vacuum wicketting arrangement according to claim 3, in which each said arm has a surface treatment on its gripping face, to improve friction between such arm and a plastic film workpiece to be carried thereon.

7. Rotary vacuum wicketting arrangement according to claim 3, wherein each said arm has one side cut away on an axial-facing surface at its radial inward end, and with three other sides remaining to extend within the associated peripheral arm sockets, and having one or more detents in the remaining side opposite the one side cut away.

8. Rotary vacuum wicketting arrangement according to claim 2, wherein said main hub body portion has at each said arm socket a pair of said spring detents positioned radially in line with one other.

9. Rotary vacuum wicketting arrangement according to claim 1, wherein said vacuum hub includes a hose inlet connector in the form of a tube having a series of openings along its length permitting control of leakage of vacuum to said vacuum hub.

10. Rotary vacuum wicketting arrangement with tool-less adjustment and detachment for cleaning; comprising a rotary shaft a rotary hub mounted to rotate with said shaft and including a main hub body portion having a plurality of peripheral arm sockets angularly distributed thereon;

a grip ring secured to said main hub body portion and including one or more hand levers that can be set to a first portion in which the grip ring grips the hub to said shaft and to a second position in which the grip ring is released from gripping said shaft;

a wear plate secured onto one face of said main hub body portion, with openings communicating with said arm sockets;

a plurality of vacuum pickup arms releasably secured into respective ones of said arm sockets and projecting generally radially from said rotary hub; and a non-rotating vacuum hub positioned on said shaft and facing said wear plate of said rotary hub applying vacuum to said arms over a portion of their rotation about said shaft, and wherein said vacuum hub includes a hose inlet connector in the form of a tube having a series of openings along its length permitting control of leakage of vacuum to said vacuum hub.

* * * * *

UNITED STATES PATENT AND TRADEMARK OFFICE

CERTIFICATE OF CORRECTION

PATENT NO. : 7,624,980 B2
APPLICATION NO. : 11/774834
DATED : December 1, 2009
INVENTOR(S) : Tewksbury et al.

It is certified that error appears in the above-identified patent and that said Letters Patent is hereby corrected as shown below:

Col. 6, Claim 1, line 65: "anus" should read --arms--.

Signed and Sealed this

Sixteenth Day of February, 2010

David J. Kappos

David J. Kappos
*Director of the United States Patent and Trademark Office*